(12) United States Patent
Araki et al.

(10) Patent No.: US 10,297,828 B2
(45) Date of Patent: May 21, 2019

(54) NON-AQUEOUS ELECTROLYTE STORAGE ELEMENT INCLUDING POSITIVE ELECTRODE HAVING SOLID ELECTROLYTE INTERFACE MATERIAL ON SURFACE OF CARBON MATERIAL

(71) Applicants: Yuka Araki, Shizuoka (JP); Naoto Abe, Shizuoka (JP); Yoshio Itoh, Shizuoka (JP); Tatsuya Dan, Shizuoka (JP); Shuhei Takeshita, Shizuoka (JP)

(72) Inventors: Yuka Araki, Shizuoka (JP); Naoto Abe, Shizuoka (JP); Yoshio Itoh, Shizuoka (JP); Tatsuya Dan, Shizuoka (JP); Shuhei Takeshita, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 40 days.

(21) Appl. No.: 15/611,261

(22) Filed: Jun. 1, 2017

(65) Prior Publication Data
US 2017/0365852 A1 Dec. 21, 2017

(30) Foreign Application Priority Data

Jun. 15, 2016 (JP) .................................. 2016-119276
Sep. 27, 2016 (JP) .................................. 2016-188287

(51) Int. Cl.
*H01M 4/62* (2006.01)
*H01M 4/587* (2010.01)
*H01M 10/052* (2010.01)
*H01M 10/0568* (2010.01)

(52) U.S. Cl.
CPC ........... *H01M 4/587* (2013.01); *H01M 4/625* (2013.01); *H01M 10/052* (2013.01); *H01M 10/0568* (2013.01); *Y02T 10/7011* (2013.01)

(58) Field of Classification Search
CPC .... H01M 4/587; H01M 4/625; H01M 10/052; H01M 10/0568
USPC ....................................................... 429/231.8
See application file for complete search history.

(56) References Cited

U.S. PATENT DOCUMENTS

| 6,218,048 | B1 | 4/2001 | Manev et al. | |
|---|---|---|---|---|
| 2006/0269834 | A1* | 11/2006 | West | H01M 4/133 429/105 |
| 2007/0070581 | A1* | 3/2007 | Yoshida | H01G 11/32 361/502 |
| 2012/0141869 | A1 | 6/2012 | Takahata | |
| 2012/0251892 | A1* | 10/2012 | Kang | H01M 4/131 429/310 |

(Continued)

FOREIGN PATENT DOCUMENTS

| JP | 3121588 | 10/2000 |
|---|---|---|
| JP | 4754109 | 6/2011 |

(Continued)

*Primary Examiner* — Sean P Cullen
(74) *Attorney, Agent, or Firm* — Cooper & Dunham LLP

(57) ABSTRACT

To provide a non-aqueous electrolyte storage element including a positive electrode including a positive-electrode active material capable of inserting and eliminating anions, a negative electrode including a negative-electrode active material, and a non-aqueous electrolyte, wherein the positive-electrode active material includes a carbon material which has a plurality of pores constituting a three-dimensional network structure and has a solid electrolyte interface (SEI) material on a surface of the carbon material.

10 Claims, 1 Drawing Sheet

(56) References Cited

U.S. PATENT DOCUMENTS

| | | | | |
|---|---|---|---|---|
| 2013/0288125 A1* | 10/2013 | Sheem | ................ | H01M 4/628 |
| | | | | 429/212 |
| 2013/0288130 A1* | 10/2013 | Sheem | ................ | H01M 4/133 |
| | | | | 429/231.8 |
| 2017/0263386 A1* | 9/2017 | Ishikawa | ................ | C01B 31/10 |

FOREIGN PATENT DOCUMENTS

| | | | | |
|---|---|---|---|---|
| JP | 2013-232413 | | 11/2013 | |
| JP | 5408509 | | 11/2013 | |
| JP | 2014-096528 | | 5/2014 | |
| WO | WO-2016031977 A1 * | | 3/2016 | ............ C01B 31/10 |

\* cited by examiner

NON-AQUEOUS ELECTROLYTE STORAGE ELEMENT INCLUDING POSITIVE ELECTRODE HAVING SOLID ELECTROLYTE INTERFACE MATERIAL ON SURFACE OF CARBON MATERIAL

CROSS-REFERENCE TO RELATED APPLICATIONS

The present application claims priority under 35 U.S.C. § 119 to Japanese Patent Application No. 2016-119278 filed Jun. 15, 2016 and Japanese Patent Application No. 2016-188287 filed Sep. 27, 2016. The contents of which are incorporated herein by reference in their entirety.

BACKGROUND OF THE INVENTION

Field of the Invention

The present disclosure relates to a non-aqueous electrolyte storage element.

Description of the Related Art

Along with reductions in sizes and improvements in performances of current mobile devices, properties of non-aqueous electrolyte storage elements having high energy densities have been improved and widely used. Moreover, developments of non-aqueous electrolyte storage elements having the larger capacities and having excellent safety have been conducted, and the above-described non-aqueous electrolyte storage elements have started to be mounted in electric cars.

Under the above-described circumstances, there is a desire for applying a so-called dual intercalation non-aqueous electrolyte storage element for practical use as storage elements having a high energy density and suitable for high-speed charging and discharging. The dual intercalation storage element uses a carbonaceous material in a positive electrode, and therefore elution of elements etc., from the positive electrode does not occur even with high voltage, and the storage element can be operated stably. However, the dual intercalation storage element has a problem that a large amount of gas is generated when a cycle of charging and discharging is repeated. It is assumed that the generation of gas is caused because decomposition of an electrolyte occurs at an interface between an electrode and the electrolyte.

In order to suppress the decomposition of the electrolyte, a solid electrolyte interface (SEI) composed of a decomposition product of the electrolyte, etc., is formed on a surface of a negative electrode in a typical lithium secondary cell. It has been known that the SEI does not have electric conductivity but has lithium ion conductivity, and formation of the SEI suppresses decomposition of the electrolyte.

For example, disclosed is that, by performing a step for performing initial charge on an assembled cell up to a predetermined potential value (preliminary charge treatment), and a step for performing an aging treatment on the cell, to which the initial charge has been performed, by retaining the cell for a predetermined period in a predetermined temperature range, part of an electrolyte component is intentionally reduction-decomposed at the time of the initial charge to cover a surface of the negative electrode with an SEI film composed of the decomposition product of the electrolyte component, and further reduction-decomposition of the electrolyte component on the surface of the negative electrode can be prevented at the time when the cell is normally used (see, for example, Japanese Patent No. 5408509).

Moreover disclosed is that boron per se or a boron-containing functional group is introduced onto a surface of a material by performing a high-frequency heat plasma treatment on a negative electrode composition in a plasma gas atmosphere including $BF_3$, and an SEI can be stably generated on the surface of the negative electrode because of the presence of the boron or the boron-containing functional group (see, for example, Japanese Patent No. 4754109).

Moreover, disclosed is that, by performing a heat treatment on a positive electrode material at 50° C. through 120° C. for 1 hour through 2 months in a discharged state, a passivation film including an SEI and a polymer electrolyte PEI can be formed on a surface of the positive electrode (see, for example, Japanese Patent No. 3121588).

SUMMARY OF THE INVENTION

According to one aspect of the present disclosure, a non-aqueous electrolyte storage element includes a positive electrode including a positive-electrode active material capable of inserting and eliminating anions, a negative electrode including a negative-electrode active material, and a non-aqueous electrolyte. The positive-electrode active material includes a carbon material which has a plurality of pores constituting a three-dimensional network structure and has a solid electrolyte interface (SEI) material on a surface of the carbon material.

Figure 1:
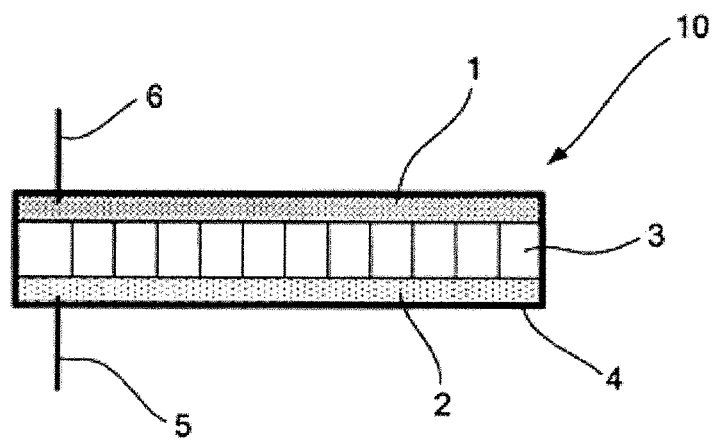
FIG. 1 is a schematic view illustrating one example of a non-aqueous electrolyte storage element of the present disclosure.

DESCRIPTION OF THE EMBODIMENTS (Non-aqueous Electrolyte Storage Element)

A non-aqueous electrolyte storage element of the present disclosure includes a positive electrode including a positive-electrode active material capable of inserting and eliminating anions, a negative electrode including a negative-electrode active material, and a non-aqueous electrolyte. The positive-electrode active material includes a carbon material which has a plurality of pores constituting a three-dimensional network structure and has a solid electrolyte interface (SEI) material on a surface of the carbon material. The non-aqueous electrolyte storage element may further include other members, if necessary.

The non-aqueous electrolyte storage element has been accomplished based on the following findings. The techniques disclosed in Japanese Patent Nos. 5408509 and 4754109 are related to a method for forming an SEI on a negative electrode of a lithium-ion secondary cell, and formation of an SEI onto a surface of a positive electrode is not disclosed. Since the SEI is mainly generated by a reduction decomposition reaction of an electrolyte, formation of an SEI rarely occurs on a surface of a positive electrode of a typical lithium-ion secondary cell.

Moreover, the non-aqueous electrolyte storage element of the present disclosure has been accomplished based on the following findings. The technique disclosed in Japanese Patent No. 3121588 is different from the method for forming an SEI onto a surface of a typical negative electrode as disclosed in Japanese Patent Nos. 5408509 and 4754109, and a special SEI formation process is required before forming a positive electrode composite or before assembling a storage element. Accordingly, handling is extremely difficult when a storage element is produced.

The present disclosure has an object to provide a non-aqueous electrolyte storage element that can inhibit generation of gas without degrading properties as a storage element.

The present disclosure can provide a non-aqueous electrolyte storage element that can inhibit generation of gas without degrading properties as a storage element.

In order to solve the above-described problems, the present inventors have diligently conducted researches. As a result, the present inventors have arrived at the following findings. In the case where charging and discharging of a dual intercalation storage element are performed at a side of a positive electrode having a plurality of pores constituting a three-dimensional network structure at a high voltage range, generation of gas caused by decomposition of an electrolyte during charging and in the charged state is a serious problem. In this case, generation of gas is suppressed while a high capacity is obtained, without generating gas, reducing a capacity, and reducing a cycle life, if an SEI can be formed onto a positive electrode of the storage element as in the formation of SEI onto a negative electrode known in the art.

In the non-aqueous electrolyte storage element of the present disclosure, a raw material of a carbon material, a production method of the non-aqueous electrolyte storage element, and other properties of the non-aqueous electrolyte storage element are not particularly limited, as long as the non-aqueous electrolyte storage element has a solid electrolyte interface (SEI) material on a surface of a positive electrode active material in a system where the carbon material having a plurality of pores constituting a three-dimensional network structure is used. Moreover, other constitutional elements of the storage element performing anion intercalation using the positive electrode, such as a negative electrode and an electrolyte, are not particularly limited.

Each of the constitutional members of the non-aqueous electrolyte storage element of the present disclosure will be described in detail hereinafter.

<Positive Electrode>

The positive electrode is not particularly limited and may be appropriately selected depending on the intended purpose, as long as the positive electrode includes a positive-electrode electricity-storing material (e.g., a positive-electrode active material). Examples of the positive electrode include a positive electrode in which a positive electrode material including a positive-electrode active material is disposed on a positive electrode collector.

A shape of the positive electrode is not particularly limited and may be appropriately selected depending on the intended purpose. Examples of the shape include a plate shape.

—Positive Electrode Material—

The positive electrode material is not particularly limited and may be appropriately selected depending on the intended purpose. For example, the positive electrode material includes at least a positive-electrode active material, and may further include a conduction auxiliary agent, a binder, a thickening agent, etc., if necessary.

——Positive-Electrode Active Material——

The positive-electrode active material includes a carbon material which has a plurality of pores constituting a three-dimensional network structure and has a solid electrolyte interface (SEI) material on a surface of the carbon material.

———Carbon Material———

The "carbon material having a plurality of pores (mesopores) constituting a three-dimensional network structure" is a capacitor, in which an electric double layer is formed by a pair of positive and negative electrolyte ions that are present over both sides of a face where mesopores (void areas) and a carbon material area are in contact with each other. Therefore, it can be understood that movements of electrolyte ions present as a pair are faster than the movements of electrolyte ions generated after a sequential chemical reaction with an electrode active material, and an ability of supplying electricity depends on, not only a size of a volume of the void areas, but also a size of a surface area of mesopores, which allows a pair of positive and negative electrolyte ions to be present.

Considering crystallinity of the carbon material, the time constant (slow response during charging and discharging) of the capacitor depends on, not only capacitance of a non-aqueous electrolyte, but also a resistance value of the carbon material area, with which the electrolyte forms an ohmic contact. Since both electrolyte ions perform chemical reactions, in which binding and separation with respective electrode active materials are repeated, moreover, there is a possibility that the carbon material is deteriorated. The crystallinity of the carbon material is preferably appropriately determined so as to have strength resistant to the above-described deterioration.

Note that, it is not necessary to have a crystalline structure in the entirety of the carbon material. An amorphous part may be present at part of the carbon material, or the entire carbon material may be amorphous.

In the carbon material, presence of mesopores is essential but presence of micropores is not essential. Accordingly, micropores may be present or may not be present, but at the time of carbonization, an organic material serving as a starting material of the carbon material typically releases a volatile material to carbonize. Accordingly, micropores are typically left as release marks, and therefore it is difficult to obtain a carbon material, which does not have micropores at all. On the other hand, mesopores are typically intentionally formed. As it has been known in the art, for example, it is often a case where a mark-forming material of an acid (alkali)-soluble metal, metal oxide, metal salts, or metal-containing organic material, and a carbon material or an organic material that is a raw material of the carbon material are shaped together, then the mark-forming material is dissolved with acid (alkali), and the marks left become mesopores.

In the present specification, pores having diameters of less than 2 nm are referred to as micropores, and pores having diameters of 2 nm or greater but 50 nm or less are referred to as mesopores. Since a size of the electrolyte ion is 0.5 nm or greater but 2 nm or less, it cannot be said that the micropores significantly contribute to movements of the ions. Accordingly, the presence of mesopores is important for smooth movements of the ions. For comparison, a size of pores in activated carbon, which is also a carbonaceous material, is known to be about 1 nm on average. In case of the activated carbon, it is regarded as one of adsorptions all of which generate heat (reduction in enthalpy) without exceptions.

The mesopores in the above-mentioned size preferably constitute a three-dimensional network structure. When the pores constitute a three-dimensional network structure, ions move smoothly.

A BET specific surface area of the carbon material is preferably 50 m²/g or greater, more preferably 50 m²/g or greater but 2,000 m²/g or less, and further preferably 800 m²/g or greater but 1,800 m²/g or less.

When the BET specific surface area is 50 m²/g or greater, a sufficient amount of pores is formed, insertion of ions is sufficiently performed, and therefore a high capacity can be obtained. When the BET specific surface area is 2,000 m²/g or less, moreover, mesopores are sufficiently formed, insertion of ions is not inhibited, and therefore a high capacity can be obtained.

For example, the BET specific surface area can be determined by performing a measurement by means of a micromeritics automatic surface area and porosimetry analyzer (TriStarII3020, available from Shimadzu Corporation), and determining the BET specific surface area from the measurement result of adsorption isotherm according to the BET (Brunauer, Emmett, Teller) method.

A pore volume of the carbon material is preferably 0.2 mL/g or greater but 2.3 mL/g or less, and more preferably 0.2 mL/g or greater but 1.7 mL/g or less. When the pore volume is 0.2 mL/g or greater, mesopores rarely become independent pores, and a large discharge capacity can be obtained without inhibiting movements of anions. When the pore volume of the carbon material is 2.3 mL/g or less, the energy density of the carbon material as an electrode can be enhanced without making the carbon structure bulky, and a discharge capacity per unit volume can be increased. Moreover, carbonaceous walls constituting the pores do not become thin, shapes of the carbonaceous walls can be maintained, even when accumulation and release of anions are repeated, and charging and discharging properties can be improved. Therefore, the above-mentioned pore volume is advantageous.

For example, the pore volume of the carbon material can be determined by performing a measurement by means of a micromeritics automatic surface area and porosimetry analyzer (TriStarII3020, available from Shimadzu Corporation), and determining the pore volume from the measurement result of adsorption isotherm according to the BJH (Barrett, Joyner, Hallender) method.

The carbon material may be appropriately produced for use, or appropriately selected from commercial products. Examples of the commercial products include CNovel (registered trademark) (available from Toyo Tanso Co., Ltd.).

A production method of the carbon material is not particularly limited and may be appropriately selected depending on the intended purpose. Examples of the production method include a method where a mark-forming material having a three-dimensional network structure and an organic material that is a starting material for a carbon material are shaped and carbonized the organic material, followed by dissolving the mark-forming material with acid or alkali. In the above-mentioned method, marks left by dissolving the mark-forming material become a plurality of mesopores constituting a three-dimensional network structure, which can be intentionally formed.

The mark-forming material is not particularly limited and may be appropriately selected depending on the intended purpose. Examples of the mark-forming material include metals, metal oxides, metal salts, and metal-containing organic materials. Among the above-listed examples, materials soluble to acid or alkali are preferable.

The organic material is not particularly limited and may be appropriately selected depending on the intended purpose, as long as the organic material can be carbonized. Note that, the organic material releases volatile materials at the time of carbonization, hence micropores are formed as release marks. Therefore, it is difficult to produce a carbon material that does not have micropores at all.

———Solid Electrolyte Interface (SEI) Material———

In the present disclosure, a solid electrolyte interface (SEI) formed of a decomposition product of an electrolyte, etc., is formed on a surface of the positive electrode in order to suppress decomposition of the electrolyte to thereby suppress generation of gas. It has been known that the SEI material does not have electric conductivity but lithium ion conductivity, and formation of the SEI can suppress decomposition of the electrolyte.

The solid electrolyte interface (SEI) material can be formed on a surface of the positive electrode by performing an aging treatment on the produced storage element under the predetermined conditions.

For example, the aging treatment can be performed by placing the obtained storage element in a thermostat chamber of 40° C. for 5 hours, charging up to 4.5 V at a 1/5 C rate, leaving the storage element to stand for 5 hours, followed by discharging to 1.5 V at a 1/5 C rate.

Examples of the solid electrolyte interface (SEI) material include lithium fluoride, lithium carbonate, lithium oxide, organic lithium compounds, and organic polymers. Among the above-listed examples, lithium fluoride is preferable because lithium fluoride has high stability.

Whether the solid electrolyte interface (SEI) material (e.g., lithium fluoride) is formed on a surface of the positive electrode or not can be confirmed by observing peaks in the range of 685 eV or greater but 687 eV or less by X-ray photoelectron spectroscopy (XPS).

The solid electrolyte interface (SEI) ratio of the surface of the positive electrode is preferably 58% or less, more preferably 3% or greater but 58% or less, and even more preferably 13% or greater but 58% or less.

When the solid electrolyte interface (SEI) ratio of the surface of the positive electrode is 58% or less, an effect of suppressing generation of gas can be obtained without impairing properties of a storage element.

For example, the solid electrolyte interface (SEI) ratio of the surface of the positive electrode can be determined as follows.

After completing an aging treatment, a storage element is dismantled. The obtained positive electrode is washed with a dimethyl carbonate (DMC) solution. A surface elemental analysis is performed on the washed positive electrode by X-ray photoelectron spectroscopy (XPS) (AXIS-Ultra, available from Kratos Analytical Limited, Simadzu Group Company) without atmospheric exposure. Note that, the measurement is performed using Al monochrome X rays as an excitation source, at a measurement output of 105 W, with a measuring mode of Hybrid mode, and at a pass energy of 20 eV.

The formation of lithium fluoride (LiF) can be confirmed by the presence of a peak (F peak) in the range of 885 eV or greater but 687 eV or less.

A surface elemental analysis is performed on a positive electrode that is unused in a storage element in the same manner. A ratio of the positive-electrode active material relative to a surface of the unused positive electrode is calculated from the C peak derived from the positive-electrode active material appeared at 284 eV. Prom the obtained value, the ratio of the positive-electrode active material in the surface of the positive electrode is subtracted to calculate the SEI ratio of the surface of the positive electrode.

Formation of the solid electrolyte interface (SEI) material can be accelerated by performing a plasma treatment on a carbon material that is the positive-electrode active material. For example, the plasma treatment can be performed for 30 minutes in an inert gas atmosphere with a chamber internal pressure of 40 Pa, at an output of 300 W, and at a frequency of 13.56 MHz.

——Binder and Thickening Agent——

The binder and the thickening agent are not particularly limited and may be appropriately selected depending on the intended purpose, as long as the binder and the thickening agent are materials stable to a solvent used during production of an electrode, to an electrolyte, or to applied potential. Examples of the binder and the thickening agent include fluorobinders (e.g., polyvinylidene fluoride (PVDF) and polytetrafluoroethylene (PTFE)), ethylene-propylene-butadiene rubber (EPBR). styrene-butadiene rubber (SBR), isoprene rubber, acrylate-based latex, carboxymethyl cellulose (CMC), methyl cellulose, hydroxymethyl cellulose, ethyl cellulose, polyacrylic acid, polyvinyl alcohol, alginic acid, oxidized starch, starch phosphate, and casein. The above-listed examples may be used alone or in combination. Among the above-listed examples, fluorobinders (e.g., polyvinylidene fluoride (PVDF) and polytetrafluoroethylene (PTFE)), acrylate-based latex, and carboxymethyl cellulose (CMC) are preferable.

——Conduction Auxiliary Agent——

Examples of the conduction auxiliary agent include metal materials (e.g., copper and aluminium) and carbonaceous materials (e.g., carbon black, acetylene black, and carbon nanotubes). The above-listed examples may be used alone or in combination.

—Positive Electrode Collector—

A material, shape, size, and structure of the positive electrode collector are not particularly limited and may be appropriately selected depending on the intended purpose.

The material of the positive electrode collector is not particularly limited and may be appropriately selected depending on the intended purpose, as long as the positive electrode collector is formed of a conductive material and is stable to applied potential. Examples of the material include stainless steel, nickel, aluminium, titanium, and tantalum. Among the above-listed examples, stainless steel and aluminium are particularly preferable.

The shape of the positive electrode collector is not particularly limited and may be appropriately selected depending on the intended purpose.

The size of the positive electrode collector is not particularly limited and may be appropriately selected depending on the intended purpose, as long as the size is a size usable for a non-aqueous electrolyte storage element.

<Production Method of Positive Electrode>

The positive electrode can be produced by adding the binder, the thickening agent, the conductive auxiliary agent, a solvent, etc., if necessary, to the positive-electrode active material to form a positive electrode material in the form of slurry, applying the positive electrode material onto the positive electrode collector, and drying the applied positive electrode material. The solvent is not particularly limited and may be appropriately selected depending on the intended purpose. Examples of the solvent include aqueous solvents and organic solvents. Examples of the aqueous solvents include water and alcohols. Examples of the organic solvents include N-methyl-2-pyrrolidone (NMP) and toluene.

Note that, the positive electrode active material may be subjected to roll molding as it is to form a sheet electrode, or to compression molding to form a pellet electrode.

<Negative Electrode>

The negative electrode is not particularly limited and may be appropriately selected depending on the intended purpose, as long as the negative electrode includes a negative-electrode electricity-storing material (e.g., a negative-electrode active material). Examples of the negative electrode include a negative electrode in which a negative electrode material including a negative-electrode active material is disposed on a negative electrode collector.

A shape of the negative electrode is not particularly limited and may be appropriately selected depending on the intended purpose. Examples of the shape include a plate shape.

—Negative Electrode Material—

The negative electrode material includes at least a negative-electrode active material, and may further include a conduction auxiliary agent, a binder, a thickening agent, etc., if necessary.

—Negative-electrode Active Material—

The negative-electrode active material is not particularly limited and may be appropriately selected depending on the intended purpose, as long as the negative-electrode active material is a material capable of accumulating and releasing cations in and from a non-aqueous solvent system. Examples of the negative-electrode active material include carbonaceous materials, metal oxides, metals capable of forming alloys with lithium or metal alloys of the metal, composite alloy compounds including an alloy and lithium where the alloy includes lithium and a metal capable of forming an alloy with lithium, and metal lithium nitride, where the above-listed materials are capable of accumulating and releasing lithium ions as cations.

The carbonaceous material is not particularly limited and may be appropriately selected depending on the intended purpose. Examples of the carbonaceous material include graphite, and pyrolysates of organic materials obtained under various thermal decomposition conditions.

Examples of the graphite include coke, artificial graphite, and natural graphite. Among the above-listed examples, artificial graphite and natural graphite are preferable.

Examples of the metal oxide include antimony-doped tin oxide, and silicon monoxide.

Examples of the metal or metal alloy include lithium, aluminium, tin, silicon, and zinc.

Examples of the composite alloy compound with lithium include lithium titanate.

Examples of the metal lithium nitride include cobalt lithium nitride.

The above-listed negative-electrode active materials may be used alone or in combination. Among the above-listed examples, a carbonaceous material, or lithium titanate, or both are preferable in view of safety and cost.

——Binder and Thickening Agent——

The binder and the thickening agent are not particularly limited and may be appropriately selected depending on the intended purpose, as long as the binder and the thickening agent are materials stable to a solvent used during production of an electrode, to an electrolyte, or to applied potential. Examples of the binder and the thickening agent include fluorobinders (e.g., polyvinylidene fluoride (PVDF) and polytetrafluoroethylene (PTFE)), ethylene-propylene-butadiene rubber (EPBR), styrene-butadiene rubber (SBR), isoprene rubber, acrylate-based latex, carboxymethyl cellulose (CMC), methyl cellulose, hydroxyl methylcellulose, ethyl cellulose, polyacrylic acid, polyvinyl alcohol, alginic acid, oxidized starch, starch phosphate, and casein. The above-listed examples may be used alone or in combination. Among the above-listed examples, fluorobinders (e.g., polyvinylidene fluoride (PVDF) and polytetrafluoroethylene (PTFE)), styrene-butadiene rubber (SBR) and carboxymethyl cellulose (CMC) are preferable.

——Conduction Auxiliary Agent——

Examples of the conduction auxiliary agent include metal materials (e.g., copper and aluminium) and carbonaceous materials (e.g., carbon black, acetylene black, and carbon nanotubes). The above-listed examples may be used alone or in combination.

—Negative Electrode Collector—

A material, shape, size, and structure of the negative electrode collector are not particularly limited and may be appropriately selected depending on the intended purpose.

The material of the negative electrode collector is not particularly limited and may be appropriately selected depending on the intended purpose, as long as the negative electrode collector is formed of a conductive material and is stable to applied potential. Examples of the material include stainless steel, nickel, aluminium, and copper. Among the above-listed examples, stainless steel, copper, and aluminium are particularly preferable.

The shape of the negative electrode collector is not particularly limited and may be appropriately selected depending on the intended purpose.

The size of the negative electrode collector is not particularly limited and may be appropriately selected depending on the intended purpose, as long as the size is a size usable for a non-aqueous electrolyte storage element.

<Production Method of Negative Electrode>

The negative electrode can be produced by adding the binder, the thickening agent, the conduction auxiliary agent, a solvent, etc., if necessary, to the negative-electrode active material to form a negative electrode material in the form of slurry, applying the negative electrode material onto the negative electrode collector, and drying the applied negative electrode material. As the solvent, any of the solvents listed as examples of the solvent for use in the production method of the positive electrode can be used.

Moreover, the negative-electrode active material, to which the binder, the thickening agent, the conduction auxiliary agent, etc., are added, may be subjected to roll molding as it is to form a sheet electrode, or to compression molding to form a pellet electrode, or a method, such as vapor deposition, sputtering, and plating, to form a thin film of the negative-electrode active material on the negative electrode collector.

<Non-aqueous Electrolyte>

The non-aqueous electrolyte is an electrolyte formed by dissolving an electrolyte salt in a non-aqueous solvent.

—Non-aqueous Solvent—

The non-aqueous solvent is not particularly limited and may be appropriately selected depending on the intended purpose. The non-aqueous solvent is preferably an aprotic organic solvent.

As the aprotic organic solvent, a carbonate-based organic solvent, such as chain carbonate and cyclic carbonate, is used. The aprotic organic solvent is preferably a solvent of low viscosity. Among the above-listed solvents, chain carbonate is preferable because the chain carbonate has high solubility to an electrolyte salt.

Examples of the chain carbonate include dimethyl carbonate (DMC), diethyl carbonate (DEC), and methyl ethyl carbonate (EMC). Among the above-listed, examples, dimethyl carbonate (DMC) is preferable.

An amount of the DMC is not particularly limited and may be appropriately selected depending on the intended purpose. The amount of the DMC relative to the non-aqueous solvent is preferably 70% by mass or greater, more preferably 83% by mass or greater. When the amount of the DMC is less than 70% by mass, an amount of a cyclic material having a high dielectric constant increases, in the case where the rest of the solvent is the cyclic material having a high dielectric constant (e.g., cyclic carbonate and cyclic ester), and therefore a viscosity becomes excessively high when a non-aqueous electrolyte of high concentration of 3 M or greater, is produced, which may cause problems in permeation of the non-aqueous electrolyte in electrode, or diffusion of ions.

Examples of the cyclic carbonate include propylene carbonate (PC), ethylene carbonate (EC), butylene carbonate (BC), vinylene carbonate (VC), and fluoroethylene carbonate (FEC).

When ethylene carbonate (EC) as the cyclic carbonate and dimethyl carbonate (DMC) as the chain carbonate are used in combination as a mixed solvent, a blending ratio between ethylene carbonate (EC) and dimethyl carbonate (DMC) is not particularly limited and may be appropriately selected depending on the intended purpose.

As the non-aqueous solvent, ester-based organic solvents, such as cyclic ester and chain ester, and ether-based organic solvents, such as cyclic ether and chain ether, may be used, if necessary.

Examples of the cyclic ester include γ-butyrolactone (γ-BL), 2-methyl-γ-butyrolactone,acetyl-γ-butyrolactone, and γ-valerolactone.

Examples of the chain ester include alkyl propionate, dialkyl malonate, alkyl acetate (e.g., methyl acetate (MA) and ethyl acetate), and alkyl formate (e.g., methyl formate (MF) and ethyl formate).

Examples of the cyclic ether include tetrahydrofuran, alkyltetrahydrofuran, alkoxy tetrahydrofuran, dialkoxy tetrahydrofuran, 1,3-dioxolan, alkyl-1,3-dioxolan, and 1,4-dioxolan.

Examples of the chain ether include 1,2-dimethoxyethane (DME), diethyl ether, ethylene glycol dialkyl ether, diethylene glycol dialkyl ether, methylene glycol dialkyl ether, and tetraethylene glycol dialkyl ether.

—Electrolyte Salt—

As the electrolyte salt, a lithium salt is preferably used.

The lithium salt is not particularly limited, as long as the lithium salt is dissolved in a non-aqueous solvent to exhibit high ion conductivity. Examples of the lithium salt include lithium hexafluorophosphate ($LiPF_6$), lithium perchlorate ($LiClO_4$), lithium chloride (LiCl), lithium fluoroborate ($LiBF_4$), lithium hexafluoroarsenate ($LiAsF_6$), lithium trifluoromethanesulfonate ($LiCF_3SO_3$), lithium bistrifluoromethylsulfonyl imide ($LiN(CF_3SO_2)_2$), and lithium bispentafluoroethylsulfonyl imide ($LiN(CF_2F_5SO_2)_2$). The above-listed examples may be used alone or in combination. Among the above-listed examples, $LiPF_6$ or $LiBF_4$ or both are particularly preferable because of a large amount of anions accumulated in a carbon electrode.

A concentration of the electrolyte salt is not particularly limited and may be appropriately selected depending on the intended purpose. The concentration of the electrolyte salt in the non-aqueous solvent is preferably 0.5 mol/L or greater but 6 mol/L or less. In view of both a capacity of the storage element and output , the concentration is more preferably 2 mol/L or greater but 4 mol/L or less.

<Separator>

The separator is disposed between the positive electrode and the negative electrode for preventing a short circuit between the positive electrode and the negative electrode.

A material, shape, size and structure of the separator are not particularly limited and may be appropriately selected depending on the intended purpose.

Examples of the material of the separator include paper (e.g., Kraft paper, vinylon blended paper, and synthetic pulp blended paper), cellophane, polyethylene graft membranes, polyolefin nonwoven fabric (e.g., polypropylene melt-flow nonwoven fabric), polyamide nonwoven fabric, glass fiber nonwoven fabric, and micropore membranes. Among the above-listed examples, a material having a porosity of 50% or greater is preferable in view of retention of the electrolyte.

As the shape of the separator, a nonwoven fabric having a high porosity is more preferable than a thin film-type having fine pores (micropores).

An average thickness of the separator is not particularly limited and may be appropriately selected depending on the intended purpose. The average thickness is preferably 20 µm or greater but 100 µm or less. When the average thickness is less than 20 µm, a retention amount of the electrolyte may be small. When the average thickness is greater than 100 µm, the energy density may be low.

The size of the separator is not particularly limited and may be appropriately selected depending on the intended purpose, as long as the size is a size usable for a non-aqueous electrolyte storage element.

The structure of the separator may be a single-layer structure or a laminate structure.

<Production Method of Non-aqueous Electrolyte Storage Element>

The non-aqueous electrolyte storage element of the present disclosure is produced by assembling the positive electrode, the negative electrode, the non-aqueous electrolyte, and optionally a separator into an appropriate shape. Moreover, other constitutional members, such as an outer tin, can be used, if necessary. A method for assembling the non-aqueous electrolyte storage element is not particularly limited and may be appropriately selected from methods typically used.

The shape of the non-aqueous electrolyte storage element of the present disclosure is not particularly limited, and may be appropriately selected from various shapes typically used depending on the intended use. Examples of the shape include a cylinder-type where sheet electrodes and a separator are spirally disposed, a cylinder-type having an inside-out structure, where pellet electrodes and a separator are combined, and a coin-type where pellet electrodes and a separator are laminated.

One example of the non-aqueous electrolyte storage element is illustrated in FIG. 1. The non-aqueous electrolyte storage element 10 illustrated in FIG. 1 includes a positive electrode 1, a negative electrode 2, a separator 3 retaining a non-aqueous electrolyte, an outer tin 4, a positive-electrode lead-out line 6, and a negative-electrode lead-out line 5, and may further include other members, if necessary. Specific examples of the non-aqueous electrolyte storage element 10 include non-aqueous electrolyte secondary cells and non-aqueous electrolyte capacitors.

Figure 2:
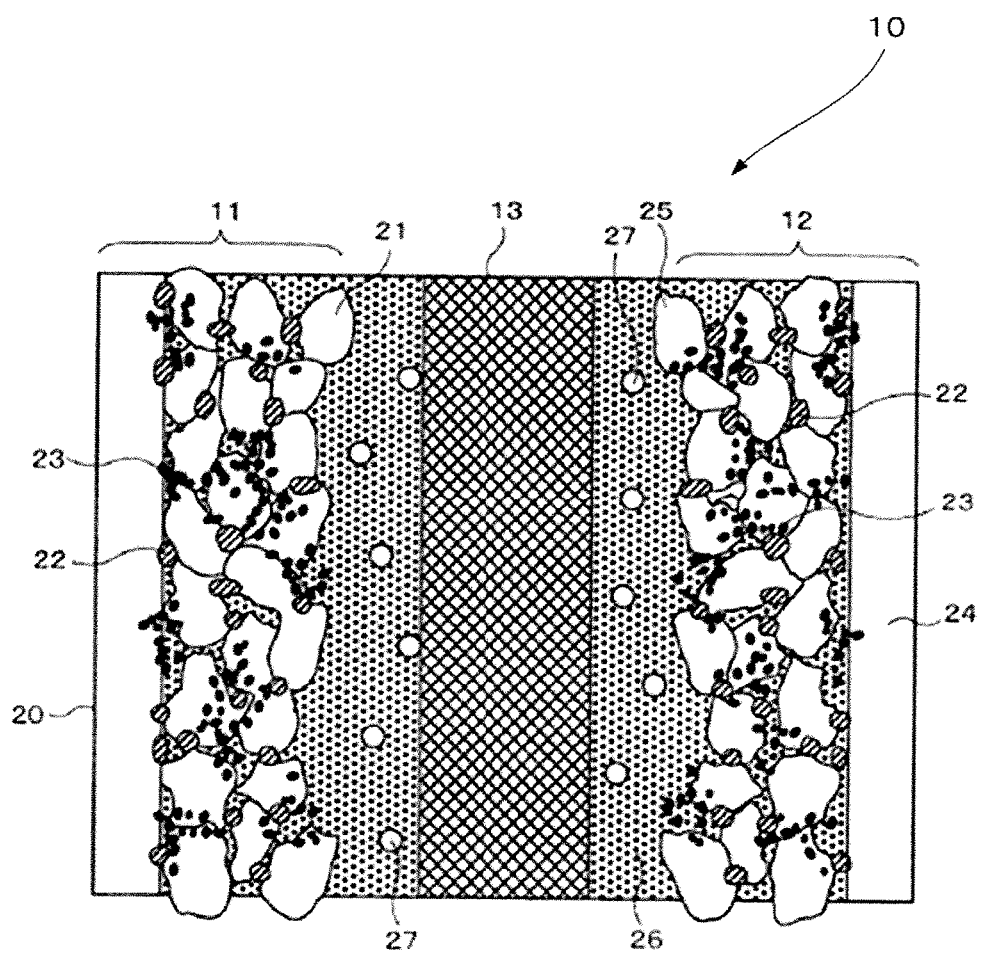
FIG. 2 is a schematic view illustrating another example of the non-aqueous electrolyte storage element of the present disclosure.

FIG. 2 is a schematic view illustrating a basic structure of the non-aqueous electrolyte storage element 10 for more clearly depicting the non-aqueous electrolyte storage element.

For example, the positive electrode 11 includes a positive electrode collector 20 formed of aluminium, carbon 21 serving as a positive-electrode active material secured on the positive electrode collector 20, a binder 22 for binding grains of the carbon 21 together, and a conduction auxiliary agent 23, which is represented by black circles, and is configured to apply conduction passes between the grains of the carbon 21.

For example, the negative electrode 12 includes a negative electrode collector 24 formed of copper, a negative-electrode active material 25 formed of a carbonaceous material etc., secured on the negative electrode collector 24, a binder 22 for binding grains of the negative-electrode active material 25 together, a conduction auxiliary agent 23, which is represented by black circles, and is configured to apply conduction passes between the grains of the negative-electrode active material 25.

A separator 13 and a non-aqueous electrolyte 26 are disposed between the positive electrode 11 and the negative electrode 12. A numerical reference 27 depicts ions. Charging and discharging are performed by inserting and eliminating ions into and from gaps between carbon layers.

In the case where $LiPF_6$ is used as an electrolyte, for example, a charging-discharging reaction of a dual intercalation-type non-aqueous electrolyte element is performed as follows. Charging is performed by inserting $PF_6^-$ from the non-aqueous electrolyte to the positive electrode and inserting $Li^+$ from the non-aqueous electrolyte to the negative electrode, and discharging is performed by eliminating $PF_6^-$ from the positive electrode and $Li^+$ from the negative electrode to the non-aqueous electrolyte.

<Use>

Use of the non-aqueous electrolyte storage element of the present disclosure is not particularly limited, and the non-aqueous electrolyte storage element can be applied for various types of use. Examples of the use include power sources or back-up power sources for laptop computers, stylus-operated computers, mobile computers, electronic book players, mobile phones, mobile facsimiles, mobile photocopiers, mobile printers, headphone stereos, video movie players, liquid crystal televisions, handy cleaners, portable CD players, minidisk players, transceivers, electronic organizers, calculators, memory cards, mobile tape recorders, radios, motors, lighting equipment, toys, game equipment, clocks, strobes, cameras, electric bicycles, and electric tools.

EXAMPLES

The present disclosure will be described in more detail by way of the following Examples. However, the present disclosure should not be construed as being limited to these Examples.

Example 1

<Production of Positive Electrode>

Porous carbon (CNovel (registered trademark), available from Toyo Tanso Co., Ltd.) was used as a positive-electrode active material, acetylene black (Denka Black powder, available from Denka Company Limited) was used as a conduction auxiliary agent, carboxymethyl cellulose (DAICEL 2200, available from Daicel Corporation) was used as a thickening agent, and acrylate-based latex (TRD202A, available from JSR Corporation) was used as a binder. The positive-electrode active material, the conduction auxiliary agent, the thickening agent, and the binder were blended at the ratio of 85.0:6.2:6.3:2.5 based on the solid contents (% by mass) of the above-mentioned materials. To the resultant mixture, water was added to form a slurry a viscosity of which was adjusted to an appropriate value. The resultant slurry was applied onto one side of an aluminium foil having a thickness of 20 μm by a doctor blade.

A coated amount after drying (a mass of the carbon active material powder in the coated positive electrode) was 3 mg/cm² on average. A cut piece having a diameter of 16 mm was stamped out of the resultant, to thereby produce a positive electrode.

The porous carbon (CNovel (registered trademark), available from Toyo Tanso Co., Ltd.) had a plurality of pores constituting a three-dimensional network structure, and had a BET specific surface area of 1,730 m²/g and a pore volume of 2.27 ml/g.

<Production of Negative Electrode>

Artificial graphite (MAGD, available from Hitachi Chemical Co., Ltd.) was used as a negative-electrode active material, acetylene black (Denka Black powder, available from Denka Company Limited) was used as a conduction auxiliary agent, an SBR-based binder (EX1215, available from Denka Company Limited) was used as a binder, and carboxylmethyl cellulose (DAICEL 2200, available from Daicel Corporation) was used as a thickening agent. The negative-electrode active material, the conduction auxiliary agent, the binder, and the thickening agent were blended at the ratio of 90.9:4.5:2.7:1.8 based on the solid contents (% by mass) of the above-mentioned materials. To the resultant mixture, water was added to form a slurry a viscosity of which was adjusted to an appropriate value. The resultant slurry was applied onto one side of a copper foil having a thickness of 18 μm by a doctor blade.

A coated amount after drying (a mass of the carbon active powder in the coated negative electrode) was 10 mg/cm² on average. A cut piece having a diameter of 16 mm was stamped out of the resultant, to thereby produce a negative electrode.

<Separator>

As a separator, 2 sheets, each of which had been obtained by stamping a piece having a diameter of 16 mm out of glass filter paper (GA100, available from ADVANTEC), were prepared.

<Non-aqueous Electrolyte>

As a non-aqueous electrolyte, a 2 mol/L LiBF$_4$ solution was prepared by using a mixed solvent of ethylene carbonate (EC), dimethyl carbonate (DMC), and methyl ethyl carbonate (EMC) at a volume ratio of 1:1:1.

<Production of Storage Element>

After vacuum-drying the positive electrode, the negative electrode, and the separator for 4 hours at 150° C. a 2032-type coin cell was assembled in a dry argon glove box to obtain a storage element.

<Aging Treatment>

The obtained storage element was placed in a thermostat chamber of 40° C. for 5 hours, and then the storage element was charged up to 4.5 V at a 1/5 C rate, followed by leaving the storage element to stand for 5 hours. Then, the storage element was discharged to 1.5 V at a 1/5 C rate (aging treatment). In the manner described above, a non-aqueous electrolyte storage element of Example 1 was produced.

Example 2

A storage element was produced and an aging treatment was performed in the same manner as in Example 1 to produce a non-aqueous electrolyte storage element of Example 2, except that 1% by mass of vinylene carbonate (VC, Additive A) was added to the non-aqueous electrolyte.

Example 3

A storage element was produced and an aging treatment was performed in the same manner as in Example 1 to produce a non-aqueous electrolyte storage element of Example 3, except that 1% by mass of fluoroethylene carbonate (FEC, Additive B) was added to the non-aqueous electrolyte.

Example 4

A storage element was produced and an aging treatment was performed in the same manner as in Example 1 to produce a non-aqueous electrolyte storage element of Example 4, except that the positive-electrode active material was changed to porous carbon (CNovel (registered trademark), available from Toyo Tanso Co., Ltd.), which had been subjected to a plasma treatment (treated for 30 minutes in an inert gas atmosphere, with an output of 300 W, at a frequency of 13.56 MHz) under the reduced pressure of 40 Pa.

The porous carbon (CNovel (registered trademark), available from Toyo Tanso Co., Ltd.) subjected to the plasma treatment under the reduced pressure of 40 Pa had a plurality of pores constituting a three-dimensional network structure, and had a BET specific surface area of 1,730 m²/g and a pore volume of 2.27 mL/g.

Example 5

A storage element was produced and an aging treatment was performed in the same manner as in Example 4 to produce a non-aqueous electrolyte storage element, of Example 5, except that the positive electrode identical to the positive electrode used in Example 4 was used, and 1% by mass of vinylene carbonate (VC, Additive A) was added to the non-aqueous electrolyte.

Example 6

A non-aqueous electrolyte storage element of Example 8 was produced in the same manner as in Example 1, except that, as the aging treatment, the storage element of Example 1 was placed in the thermostat chamber of 40° C. for 5 hours, then charged up to 4.4 V at a 1/5 C rate, left to stand for 5 hours and then discharged to 1.8 V at a 1/5 C rate.

Example 7

A non-aqueous electrolyte storage element of Example 7 was produced in the same manner as in Example 5, except that, as the aging treatment, the storage element of Example 5 was placed, in the thermostat chamber of 40° C. for 5 hours, then charged up to 4.7 V at, a 1/5 C rate, left to stand for 5 hours and then discharged to 1.5 V at a 1/5 C rate.

Example 8

A non-aqueous electrolyte storage element of Example 8 was produced in the same manner as in Example 1, except that, as the aging treatment, the storage element of Example 1 was placed in the thermostat chamber of 40° C. for 5 hours, then charged up to 3.5 V at a 1/5 C rate, left to stand for 5 hours and then discharged to 2.0 V at a 1/5 C rate.

Example 9

A non-aqueous electrolyte storage element of Example 9 was produced in the same manner as in Example 5, except that, as the aging treatment, the storage element of Example 5 was placed in the thermostat chamber of 40° C. for 5 hours, then charged up to 5.4 V at a 1/5 C rate, left to stand for 5 hours and then discharged to 1.5 V at a 1/50 rate.

Comparative Example 1

A non-aqueous electrolyte storage element of Comparative Example 1 was produced in the same manner as in Example 1, except that, instead of the aging treatment, the storage element of Example 1 was placed in the thermostat chamber of 23° C. for 5 hours.

Next, various properties of each of the obtained non-aqueous electrolyte storage elements were evaluated. The results are presented in Table 2.

<Confirmation of Formation of LiF, and Calculation of SEI Ratio in Surface of Positive Electrode>

After completing the aging treatment, each storage element was dismantled. The positive electrode was then washed with a dimethyl carbonate (DMC) solution. A surface elemental analysis of the positive electrode was performed by X-ray photoelectron spectroscopy (XPS) (AXIS-Ultra, available from Kratos Analytical limited, Simadzu Group Company) without atmospheric exposure. Note that, the measurement was performed using Al monochrome X rays as an excitation source, at a measurement output of 105 W, with a measuring mode of Hybrid mode, and at a pass energy of 20 eV.

The formation of lithium fluoride (LiF) was confirmed by the presence of a peak (F peak) in the range of 685 eV or greater but 687 eV or less.

Moreover, a surface elemental analysis was performed in the same manner on a positive electrode that was unused in a storage element. A ratio of the positive electrode active material relative to a surface of the unused positive electrode was calculated from the C peak derived from the positive-electrode active material appeared at 284 eV. From the obtained value, the ratio of the positive-electrode active material in the surface of the positive electrode of each of Examples 1 to 9 and Comparative Example 1 was subtracted to calculate the SEI ratio of the surface of the positive electrode.

<Measurement of Initial Capacity and Capacity Retention Rate>

Each storage element after being subjected to the aging treatment was charged up to 4.4 V at a 5 C rate at 40° C., followed by resting for 5 minutes, and then the storage element was discharged to 1.8 V. The above-described process was repeatedly performed 100 times. The discharge capacity at the $10^{th}$ process was determined as an initial capacity value. The capacity retention rate was calculated from the value at the $100^{th}$ process relative to the initial capacity.

Note that, the charging and discharging test was performed by means of an automatic battery cell evaluation device, 1024B-7V0.1A-4 (available from Electro Field Co., Ltd.).

<Measurement of Gas Generation Amount>

A measurement of a gas generation amount was performed on each storage element by means of ECC-Press-DL available from EL-CELL GmbH. For the measurement, the pressure after completing the aging treatment was set as a standard. The storage element was charged up to 4.4 V at a 5 C rate at 40° C. rested for 5 minutes, and then discharged to 1.8 V. The above-described process was repeatedly performed 100 times. The pressure after performing the process 100 times was measured and converted into a volume, which was determined as a gas generation amount.

Next, structural conditions of the storage elements of Examples 1 to 9 and Comparative Example 1 are summarized in Table 1.

TABLE 1

| | Structure of storage element | | | | |
|---|---|---|---|---|---|
| | Plasma treatment of positive electrode carbon material | Additive A (VC) | Additive B (FEC) | Aging treatment conditions | |
| | | | | Temperature | Voltage |
| Ex. 1 | Not performed | Absent | Absent | 40° C. | Charge: 4.5 V Discharge: 1.5 V |
| Ex. 2 | Not performed | Present | Absent | | |
| Ex. 3 | Not performed | Absent | Present | | |
| Ex. 4 | Performed | Absent | Absent | | |
| Ex. 5 | Performed | Present | Absent | | |
| Ex. 6 | Not performed | Absent | Absent | | Charge: 4.4 V Discharge: 1.8 V |
| Ex. 7 | Performed | Present | Absent | | Charge: 4.7 V Discharge: 1.5 V |
| Ex. 8 | Not performed | Absent | Absent | | Charge: 3.5 V Discharge: 2.0 V |
| Ex. 9 | Performed | Present | Absent | | Charge: 5.4 V Discharge: 1.5 V |
| Comp. Ex. 1 | Not performed | Absent | Absent | 23° C. | No |

TABLE 2

| | After aging treatment | | After 40° C. charging-discharging test | | |
|---|---|---|---|---|---|
| | SEI ratio (%) of positive electrode surface | Presence of peak between 685 eV and 687 eV by XPS | Initial capacity (mAh/g) | Capacity retention rate (%) | Gas generation amount (μL) |
| Ex. 1 | 13 | Present | 79.3 | 98.2 | 90 |
| Ex. 2 | 18 | Present | 81.2 | 99.8 | 40 |
| Ex. 3 | 16 | Present | 80.7 | 99.3 | 60 |
| Ex. 4 | 36 | Present | 81.1 | 100.0 | 20 |
| Ex. 5 | 45 | Present | 81.3 | 100.0 | 10 |
| Ex. 6 | 5 | Present | 80.3 | 99.8 | 280 |
| Ex. 7 | 58 | Present | 81.6 | 95.4 | 10 |
| Ex. 8 | 3 | Present | 78.6 | 97.5 | 310 |
| Ex. 9 | 66 | Present | 62.4 | 59.2 | 80 |
| Comp. Ex. 1 | 0 | Absent | 80.5 | 97.2 | 320 |

It was confirmed from the results in Tables 1 and 2 that the presence of the SEI was confirmed on the surface of the positive electrode 5 of each of Examples 1 to 9, and the peak derived from LiF was confirmed in the range of 685 eV through 687 eV by XPS in each of Examples 1 to 9, and therefore it was found that SEI including lithium fluoride (LiF) was formed.

The reason for that the SEI was formed on the surface of the 10 positive electrode in each of Examples 1 to 9 was assumed as follows. To compare between Example 1 and Comparative Example 1 both having the identical electrode structure, in Example 1, insertion of anions into the positive electrode and insertion of cations into the negative electrode, which were a reaction unique to a dual intercalation storage element, occurred, when the retention at 40° C. and charging and discharging were performed as the aging treatment, and as a result, Li ions and F ions were generated within the storage elements and the Li ions and F ions were then reacted to form the SEI including LiF.

Looking at the gas generation amount closely, it was found that in Comparative Example 1 where the SEI was not formed on the surface of the positive electrode, a large amount of the gas, i.e., 320 μL, was generated after the charging-discharging test at 40° C. In Examples 1 to 9 where the SEI was formed on the surface of the positive electrode, meanwhile, it was found that the gas generation amount was able to be suppressed without changing the initial capacity or capacity retention rate.

In Example 9, the gas generation amount was reduced, but the reductions were observed in the initial capacity and the capacity retention rate. It was assumed that the reductions in the initial capacity and the capacity retention rate were caused because excessive formation of the solid electrolyte interface (SEI) component on the surface of the positive electrode lead to high resistivity to thereby lower properties of the storage element. It is considered that, in the structure of the storage element of the present disclosure, the SEI ratio of the surface of the positive electrode is preferably in the range of 58% or less, at which an effect of suppressing generation of gas is obtained without impairing electricity storing properties. In Example 8 where the SEI ratio of the surface of the positive electrode was the lowest, moreover, it was found that the formation of the SEI as a protective film had an effect of reducing the gas generation amount because the reduction in the gas generation amount was observed even through it was the slight reduction. In Example 1 where the SEI ratio of the surface of the positive electrode was 13%, the significant reduction in the gas generation amount was confirmed compared with Comparative Example 1. Therefore, it is assumed that the SEI ratio of the surface of the positive electrode effective for reducing generation of gas is desirably 13% or greater but 58% or less.

In Examples 2 and 3, moreover, it was assumed that the gas generation amount was reduced because addition of Additive A or Additive B accelerated reduction decomposition on the surface of the negative electrode in the aging treatment to form an SEI also on the surface of the negative electrode.

Particularly in Examples 4 and 5 where the plasma treatment was performed on the carbon material of the positive electrode, the SEI ratio of the surface of the positive electrode was particularly high, and a significant effect of suppressing generation of gas could be obtained. It was assumed that the reason for this was that the plasma treatment performed on the carbon material of the positive electrode was effective. As a result of the plasma treatment, a functional group, such as a carboxyl group and a hydroxyl group, on the surface of the carbon material was removed, and therefore it was assumed that the reaction for forming an SEI, such as of lithium fluoride, was accelerated more than a decomposition reaction of the functional group.

It was found from the results above that a storage element capable of suppressing generation of gas without degrading properties of the storage element could be provided by that, in a dual intercalation non-aqueous electrolyte storage element, the positive-electrode active material included a carbon material having a plurality of pores constituting a three-dimensional network structure, and having a solid electrolyte interface (SEI) material on a surface of the carbon material.

For example, aspects of the present disclosure are as follows.

<1> A non-aqueous electrolyte storage element including:
a positive electrode including a positive-electrode active material capable of inserting and eliminating anions;
a negative electrode including a negative-electrode active material; and
a non-aqueous electrolyte,
wherein the positive-electrode active material includes a carbon material which has a plurality of pores constituting a three-dimensional network structure and has a solid electrolyte interface (SEI) material on a surface of the carbon material.

<2> The non-aqueous -electrolyte storage element according to <1>, wherein the solid electrolyte interface (SEI) material includes lithium fluoride.

<3> The non-aqueous electrolyte storage element according to <1> or <2>,
wherein the positive electrode has a peak in a range of 885 eV or greater but 687 eV or less, when the positive electrode is measured by X-ray photoelectron spectroscopy (XPS).

<4> The non-aqueous electrolyte storage element according to any one of <1> to <3>,
wherein a solid electrolyte interface (SEI) ratio of a surface of the positive electrode is 58% or less.

<5> The non-aqueous electrolyte storage element according to any one of <1> to <4>,
wherein a solid electrolyte interface (SEI) ratio of a surface of the positive electrode is 13% or greater but 58% or less.

<6> The non-aqueous electrolyte storage element according to any one of <1> to <5>,
wherein a BET specific surface area of the carbon material is 50 $m^2/g$ or greater, and a pore volume of the carbon material is 0.2 mL/g or greater but 2.3 mL/g or less.

<7> The non-aqueous electrolyte storage element according to any one of <1> to <6>,
wherein diameters of the pores are 2 nm or greater but 50 nm or smaller.

<8> The non-aqueous electrolyte storage element according to any one of <1> to <7>.
wherein the non-aqueous electrolyte includes $LiPF_6$, or $LiBF_4$, or both.

<9> The non-aqueous electrolyte storage element according to any one of <1> to <8>,
wherein a non-aqueous solvent included in the non-aqueous electrolyte is an aprotic organic solvent.

<10> The non-aqueous electrolyte storage element according to <9>, wherein the aprotic organic solvent is chain carbonate.

<11> The non-aqueous electrolyte storage element according to any one of <1> to <10>,
wherein the negative-electrode active material includes a carbonaceous material, or lithium titanate, or both.

<12> The non-aqueous electrolyte storage element according to any one of <1> to <11>, further including a separator between the positive electrode and the negative electrode.

<13> The non-aqueous electrolyte storage element according to <12>, wherein an average thickness of the separator is 20 μm or greater but 100 μm or less.

The non-aqueous electrolyte storage element according to any one of <1> to <13> can solve the above-described various problems existing in the art, and can achieve the above-described object of the present disclosure.

What is claimed is:

1. A non-aqueous electrolyte storage element comprising:
    a positive electrode including a positive-electrode active material into which anions are inserted during charging of the non-aqueous electrolyte storage element, and from which the anions are eliminated during discharging of the non-aqueous electrolyte storage element;
    a negative electrode including a negative-electrode active material; and
    a non-aqueous electrolyte,
    wherein the positive-electrode active material including a carbon material which has a plurality of mesopores constituting a three-dimensional network structure,
    the non-aqueous electrolyte storage element further including a solid electrolyte interface (SEI) material contacting a surface of the positive electrode.

2. The non-aqueous electrolyte storage element according to claim 1,
    wherein the solid electrolyte interface (SEI) material includes lithium fluoride.

3. The non-aqueous electrolyte storage element according to claim 1,
    wherein the positive electrode has a peak in a range of 685 eV or greater but 687 eV or less, when the positive electrode is measured by X-ray photoelectron spectroscopy (XPS).

4. The non-aqueous electrolyte storage element according to claim 1,
    wherein a ratio of a solid electrolyte interface (SEI) on the surface of the positive electrode is 58% or lower.

5. The non-aqueous electrolyte storage element according to claim 1,
    wherein a ratio of a solid electrolyte interface (SEI) on the surface of the positive electrode is 13% or greater but 58% or less.

6. The non-aqueous electrolyte storage element according to claim 1, wherein a BET specific surface area of the carbon material is 50 $m^2/g$ or greater, and a pore volume of the carbon material is 0.2 mL/g or greater but 2.3 mL/g or less.

7. The non-aqueous electrolyte storage element according to claim 1, wherein the plurality of mesopores constituting the three-dimensional network structure of the carbon material have diameters of 2 nm or greater but 50 nm or less.

8. The non-aqueous electrolyte storage element according to claim 1, wherein the negative-electrode active material includes a carbonaceous material, or lithium titanate, or both.

9. The non-aqueous electrolyte storage element according to claim 1, wherein the non-aqueous electrolyte includes $LiPF_6$ or $LiBF_4$, or both.

10. The non-aqueous electrolyte storage element according to claim 1, further comprising a separator between the positive electrode and the negative electrode.

* * * * *